United States Patent
Hsu et al.

(10) Patent No.: US 9,530,223 B2
(45) Date of Patent: Dec. 27, 2016

(54) IMAGE CORRECTION METHOD AND IMAGE CORRECTION DEVICE

(71) Applicant: AU Optronics Corp., Hsin-Chu (TW)

(72) Inventors: Ting-Wei Hsu, Hsin-Chu (TW); Chao-Wei Yeh, Hsin-Chu (TW); Chien-Wen Chen, Hsin-Chu (TW); Chien-Huang Liao, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 15/016,603

(22) Filed: Feb. 5, 2016

(65) Prior Publication Data
US 2016/0275697 A1     Sep. 22, 2016

(30) Foreign Application Priority Data
Mar. 18, 2015    (TW) .............................. 104108679 A

(51) Int. Cl.
*G06K 9/00*     (2006.01)
*G06T 7/40*     (2006.01)
*G06T 5/00*     (2006.01)

(52) U.S. Cl.
CPC ............... *G06T 7/408* (2013.01); *G06T 5/001* (2013.01); *G06T 2207/10024* (2013.01); *G06T 2207/20004* (2013.01); *G06T 2207/20048* (2013.01); *G06T 2207/20172* (2013.01); *G06T 2207/30168* (2013.01)

(58) Field of Classification Search
CPC ........... G06T 5/001; G06T 5/40; H04N 9/045; H04N 1/6027; H04N 1/60; H04N 9/69; H04N 9/73; H04N 9/735; H04N 1/40012; H04N 1/40018; H04N 1/40025; H04N 1/40031; H04N 1/40037; H04N 1/40043; H04N 1/4005; H04N 1/40056; H04N 1/40062; H04N 1/40068; H04N 1/40075
See application file for complete search history.

(56) References Cited

U.S. PATENT DOCUMENTS

| | | | |
|---|---|---|---|
| 8,508,449 | B2 | 8/2013 | Broughton et al. |
| 2011/0187735 | A1 | 8/2011 | Kondoh et al. |
| 2015/0255024 | A1 | 9/2015 | Zhou |

FOREIGN PATENT DOCUMENTS

| | | |
|---|---|---|
| CN | 102257556 A | 11/2011 |
| CN | 102132572 | 5/2014 |
| CN | 103165094 | 1/2015 |

*Primary Examiner* — Duy M Dang
(74) *Attorney, Agent, or Firm* — McClure, Qualey & Rodack, LLP

(57) ABSTRACT

An image correction method and an image correction device are provided. The image correction method includes the following steps: obtaining a gray level value of a pixel in an image and a frequency domain value of the gray level value; determining whether the frequency domain value is smaller than a first threshold; performing an adaptive gamma correction procedure on the gray level value according to the frequency domain value and outputting the result if the frequency domain value is smaller than the first threshold; outputting the gray level value directly if the frequency domain value is not smaller than the first threshold.

14 Claims, 10 Drawing Sheets

IMAGE CORRECTION METHOD AND IMAGE CORRECTION DEVICE

CROSS-REFERENCE TO RELATED APPLICATIONS

This non-provisional application claims priority under 35 U.S.C. §119(a) on Patent Application No(s). 104108679 filed in Taiwan, R.O.C. on Mar. 18, 2015, the entire contents of which are hereby incorporated by reference.

TECHNICAL FIELD

The disclosure relates to an image correction method and an image correction device, more particularly to an image correction method and an image correction device both using an adaptive gamma correction procedure.

BACKGROUND

A variety of image devices, such as scanners, digital cameras, digital video cameras and a variety of display panels are popularized more and more with the popularity of the Internet and the enhancement of computer hardware.

Most display systems have a nonlinear display property, known as the gamma effect, which makes the brightness provided by a display system absolutely and directly proportioned to an output voltage. Because of this gamma effect, an image signal is usually corrected with a gamma curve before being displayed. Therefore, the nonlinear property of the display system can reversely be compensated in order to obtain a more real and colorful images display.

However, when the modern gamma correction is performed on the detailed image contents (i.e. high-frequency signals), such as the edge of a region or the lines of words, broken lines or color washout may easily occur on the words.

SUMMARY

In order to solve problems about the distortion of high-frequency signals or detailed content in image documents, the disclosure provides an adaptive gamma correction procedure to process a gray level value of a different pixel having a different frequency.

In an embodiment, the disclosure provides an image correction method including the following steps. Extract a gray level value of one of pixels of an image and a frequency domain value of the extracted gray level value. Determine whether the frequency domain value is less than a first threshold. Perform an adaptive gamma correction procedure on the gray level value according to the frequency domain value and then output a corrected gray level value when the frequency domain value is less than the first threshold. Directly output the gray level value when the frequency domain value is not less than the first threshold.

In another embodiment, the above image correction method further includes performing a gamma correction procedure on the gray level value to obtain a corrected value; determining whether the frequency domain value is less than a second threshold; and directly outputting the corrected value as the corrected gray level value when the frequency domain value is less than the second threshold.

In yet another embodiment, the above image correction method further includes obtaining a first proportion according to the frequency domain value and calculating a product of the corrected value and the first proportion to obtain a first transformed value when the frequency domain value is not less than the second threshold; calculating a product of the gray level value and a second proportion to obtain a second transformed value; and outputting a sum of the first transformed value and the second transformed value. A sum of the first proportion and the second proportion is 1.

In yet another embodiment, when the frequency domain value is equal to the first threshold, the first proportion is 0; and when the frequency domain value is equal to the second threshold, the first proportion is 1.

In yet another embodiment, the above image correction method further includes calculating a gray difference between one of the pixels and each of the neighboring pixels of the pixels; and calculating an average of the gray differences and setting the average of the gray differences to be the frequency domain value of the gray level value.

In yet another embodiment, the above image correction method further includes calculating absolute row gray differences between one of the pixels and its neighboring row pixels and calculating an average of the absolute row gray differences.

In yet another embodiment, the above image correction method further includes calculating absolute column gray differences between one of the pixels and its neighboring column pixels and calculating an average of the absolute column gray differences.

In yet another embodiment, the above image correction method further includes selecting larger one of the average of the absolute row gray differences and the average of the absolute column gray differences to be the frequency domain value of the pixel.

In an embodiment, the disclosure provides an image correction device including an image capturing unit, a frequency-domain analyzer, and an adaptive corrector. The image capturing unit extracts a gray level value of one of pixels of an image. The frequency-domain analyzer is coupled to the image capturing unit, calculates a frequency domain value of the gray level value, and determines whether the frequency domain value is less than a first threshold. The adaptive corrector is coupled to the image capturing unit and the frequency-domain analyzer. The adaptive corrector performs an adaptive gamma correction procedure on the gray level value according to the frequency domain value and outputs a corrected gray level value when the frequency domain value is less than the first threshold. The adaptive corrector directly outputs the gray level value when the frequency domain value is not less than the first threshold.

As described above, the disclosure extracts a gray level value of one of pixels of an image and a frequency domain value of the extracted gray level value and then determines whether the frequency domain value is less than a first threshold. When the frequency domain value is less than the first threshold, an adaptive gamma correction procedure is performed on the gray level value according to the frequency domain value and then a corrected gray level value is outputted. When the frequency domain value is not less than the first threshold, the gray level value is directly outputted. During the adaptive gamma correction procedure, a gamma correction procedure is performed to obtain a corrected value and a decision whether the frequency domain value is less than a second threshold is made. When the frequency domain value is less than the second threshold, the corrected value is directly outputted as the corrected gray level value. When the frequency domain value is less than the first threshold but is not less than second threshold, a first proportion, a first transformed value corresponding to the first proportion, a second proportion, and a second transformed value corresponding to the second proportion are obtained according to the frequency domain value, and the sum of the first transformed value and the second transformed value is outputted in order to carry out the adaptive gamma correction. Therefore, the disclosure may avoid the distortion of high-frequency signals of images data, the discoloration of the image content or the production of broken edges in the image content caused by a conventional gamma correction.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
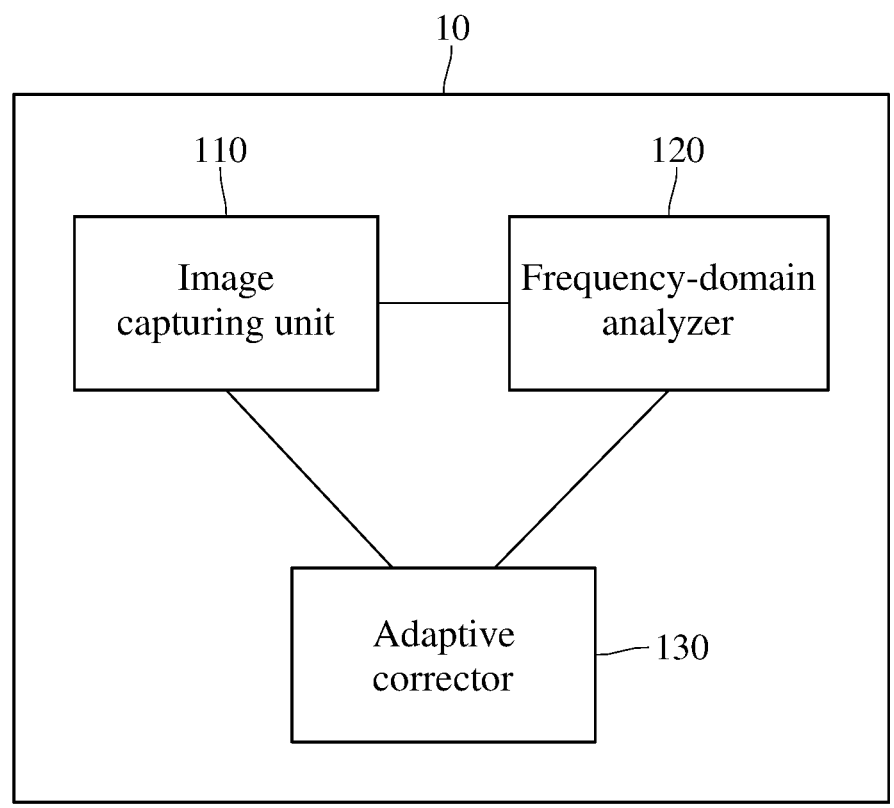
FIG. 1 is block diagram of an image correction device in an embodiment.
Figure 2:
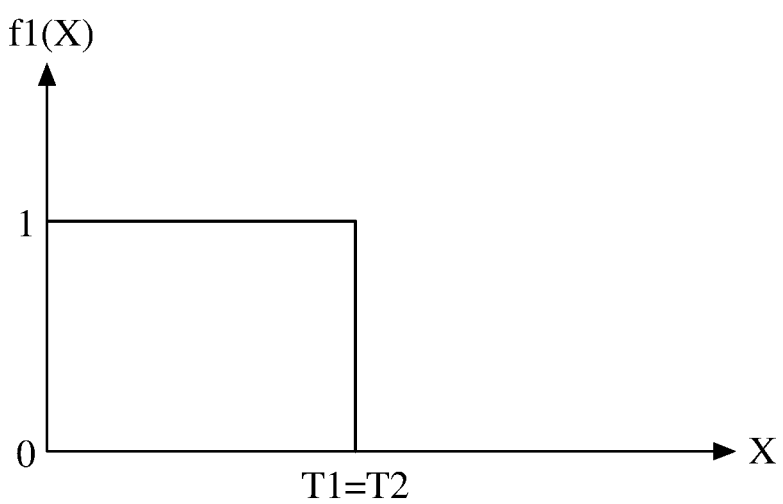
FIG. 2 is a schematic diagram of the variation of a first proportion with respect to the frequency domain value of a pixel in an embodiment.
Figure 3:
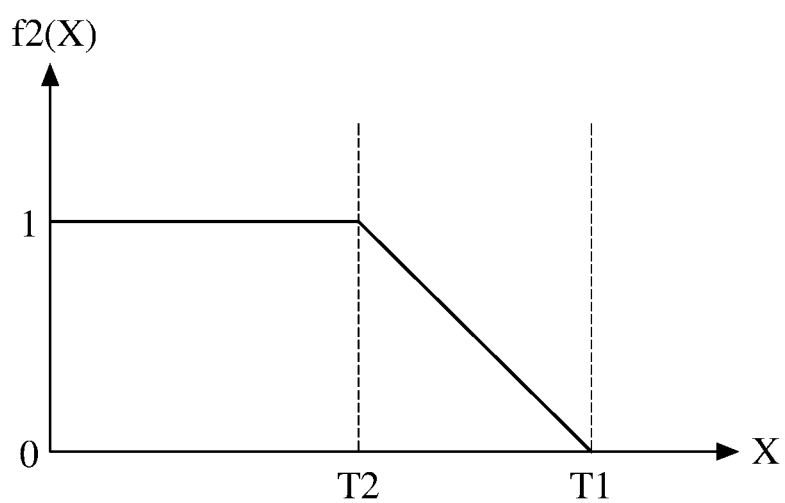
FIG. 3 is a schematic diagram of the variation of a first proportion with respect to the frequency domain value of a pixel in another embodiment.

FIG. 1 is block diagram of an image correction device 10 in an embodiment. The image correction device 10 includes an image capturing unit 110, a frequency-domain analyzer 120, and an adaptive corrector 130. The frequency-domain analyzer 120 is coupled to the image capturing unit 110. The adaptive corrector 130 is coupled to the image capturing unit 110 and the frequency-domain analyzer 120. The image capturing unit 110, the frequency-domain analyzer 120 and the adaptive corrector 130 can be fulfilled by, for example, but not limited to, a variety of microprocessors or chips. FIG. 2 is a schematic diagram of the variation of a first proportion R1 with respect to the frequency domain value of a pixel in an embodiment, where the first proportion R1 is expressed by the variation distribution f1(x). FIG. 3 is a schematic diagram of the variation of a first proportion R1 with respect to the frequency domain value x of a pixel in another embodiment, where the first proportion R1 is expressed by the variation distribution f2(x). Please refer to FIG. 1 to FIG. 3.

The image capturing unit 110 extracts a gray level value of one of pixels of an image. This image can have any amount of pixels.

The frequency-domain analyzer 120 extracts a frequency domain value of the gray level value of the pixel. The frequency-domain analyzer 120 obtains the frequency domain value by, for example, the frequency analysis performed on a region in which a respective pixel exists. For example, in an embodiment, the frequency-domain analyzer 120 calculates gray differences between a pixel and its neighboring pixels, calculates an average of the gray differences, and sets the average of the gray differences to be the frequency domain value of the pixel. Assume a pixel p(i,j) is selected, wherein i represents a row coordinate, j represents a column coordinate. Then, the frequency-domain analyzer 120 calculates an absolute difference between the gray level value of the pixel p(i,j) and each of the gray level values of its neighboring row pixels p(i+1,j) and p(i−1,j) on the same row (referred to as absolute row gray difference hereinafter) and calculates an average of the absolute row gray differences. This average of the absolute row gray differences is considered a row frequency domain value of the pixel p(i,j). Also, the frequency-domain analyzer 120 calculates an absolute difference between the gray level value of the pixel p(i,j) and each of the gray level values of its neighboring column pixels p(i,j+1) and p(i,j−1) on the same column (referred to as absolute column gray difference hereinafter) and calculates an average of the absolute column gray differences. This average of the absolute column gray differences is considered a column frequency domain value of the pixel p(i,j).

Then, the frequency-domain analyzer 120 selects the larger between the average of the absolute row gray differences and the average of the absolute column gray differences and sets the selected one to be the frequency domain value of the pixel p(i,j).

In this or some embodiments, other algorithms may be contemplated for the frequency-domain analyzer 120 to calculate the frequency domain value, such as the Fourier Transform.

Moreover, the frequency-domain analyzer 120 decides the first proportion R1 and a second proportion R2 according to the region that the frequency domain value is located in. The first proportion R1 represents the effect of the follow-up gamma correction procedure to the correction of the original gray level value, that is, the first proportion R1 is a percentage of an output value occupied by the corrected value obtained by the gamma correction procedure. The second proportion R2 is a percentage of the output value occupied by the original gray level value. The sum of the first proportion R1 and the second proportion R2 is 1. Each region is defined using the first threshold T1 and the second threshold T2. The details will be described below.

In an embodiment, the first threshold T1 is equal to the second threshold T2. As shown in FIG. 2, when the frequency domain value is less than the first threshold T1, the frequency-domain analyzer 120 sets the first proportion R1 to be 1 and the second proportion R2 to be 0. When the frequency domain value is not less than the first threshold T1, the frequency-domain analyzer 120 sets the first proportion R1 to be 0 and the second proportion R2 to be 1.

In another embodiment, the first threshold T1 is larger than the second threshold T2. As shown in FIG. 3, when the frequency domain value is less than the second threshold T2, the frequency-domain analyzer 120 sets the first proportion R1 to be 1 and the second proportion R2 to be 0. When the frequency domain value is less than the first threshold T1 but is not less than second threshold T2, the frequency-domain analyzer 120 sets the first proportion R1 and the second proportion R2 to be less than 1 and more than 0. When the frequency domain value is not less than the first threshold T1, the frequency-domain analyzer 120 sets the first proportion R1 to be 0 and the second proportion R2 to be 1. When the frequency domain value is equal to the first threshold T1, the frequency-domain analyzer 120 sets the first proportion R1 to be 0, and when the frequency domain value is equal to the second threshold T2, the frequency-domain analyzer 120 sets the first proportion R1 to be 1. The decision of the first proportion R1 and the second proportion R2 can be made by the frequency-domain analyzer 120 according to a lookup table or other algorithms.

Figure 4:
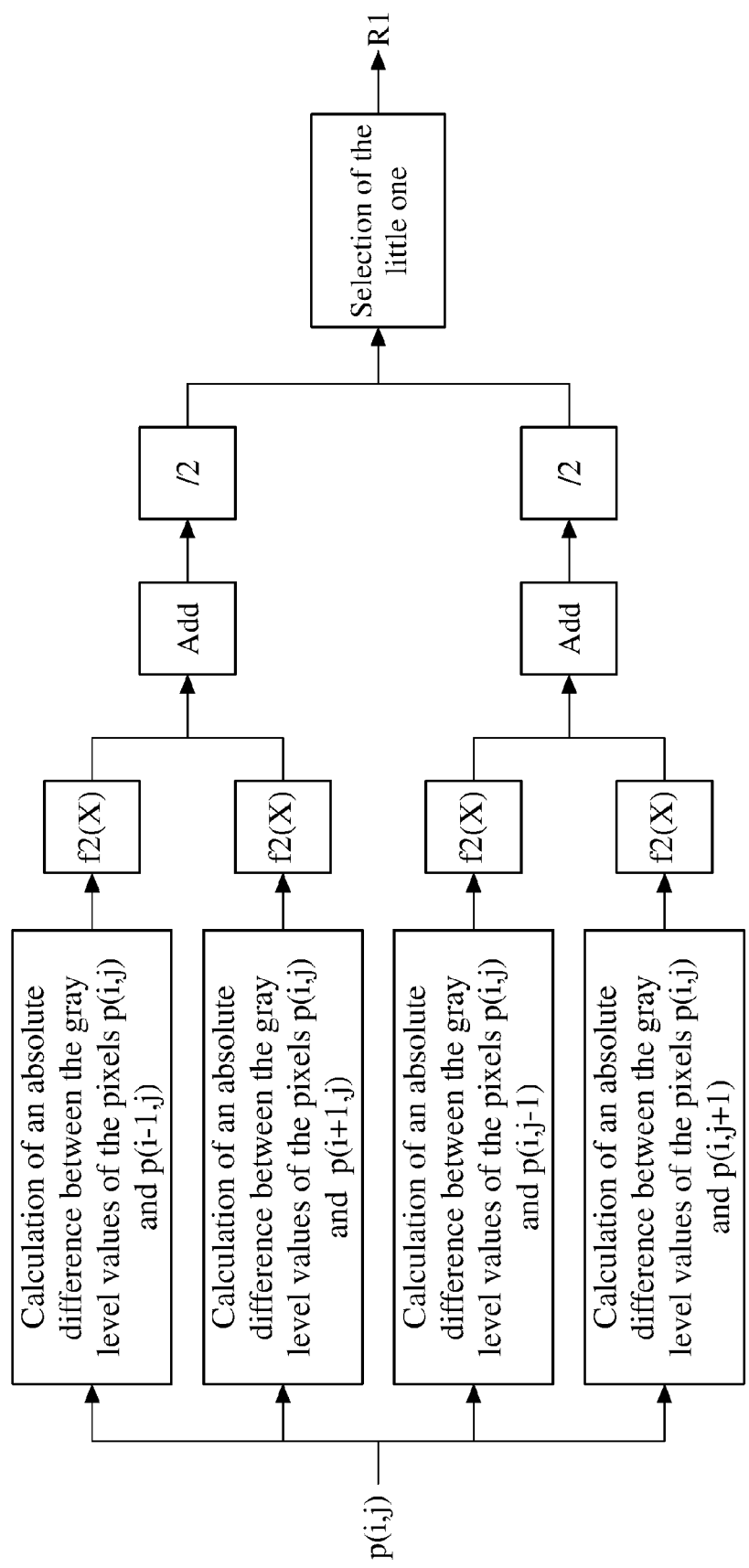
FIG. 4 is a flow chart of the calculation of the first proportion for a pixel performed by the frequency-domain analyzer in an embodiment.

FIG. 4 is a flow chart of the calculation of the first proportion R1 for a pixel p(i,j) performed by the frequency-domain analyzer 120 in an embodiment. In this embodiment, the frequency-domain analyzer 120 first calculates an absolute gray difference (i.e. the frequency domain value x) between the pixel p(i,j) and each of its neighboring pixels p(i+1,j), p(i−1,j), p(i,j+1) and p(i,j−1) and calculates the first proportion R1 corresponding to the absolute gray differences between the pixel p(i,j) and these neighboring pixels. For example, the frequency-domain analyzer 120 uses the variation distribution f2(x) to calculate the first proportion R1 according to the frequency domain value x. Then, the frequency-domain analyzer 120 calculates a row average (which is obtained by dividing the sum of the first proportions R1 by 2) of the first proportions R1 of the neighboring row pixels p(i+1,j) and p(i−1,j), calculates a column average (which is obtained by dividing the sum of the first proportions R1 by 2) of the first proportions R1 of the neighboring column pixels p(i,j+1) and p(i,j−1), and selects the little one between the row average and column average of the first proportion R1 to be the first proportion R1 of the pixel p(i,j). Likewise, the second proportion R2 of the pixel p(i,j) can be deduced by analogy.

The adaptive corrector 130 decides a voltage difference between the primary and secondary pixels among the pixels of the image during an AB decision in order to reduce the color washout in the spatial domain caused by different viewing angles. After the AB decision, the adaptive corrector 130 performs the adaptive correction according to the frequency domain value of the gray level value of the pixel in order to reduce the distortion of high-frequency signals or detailed contents in the image.

Figure 5:
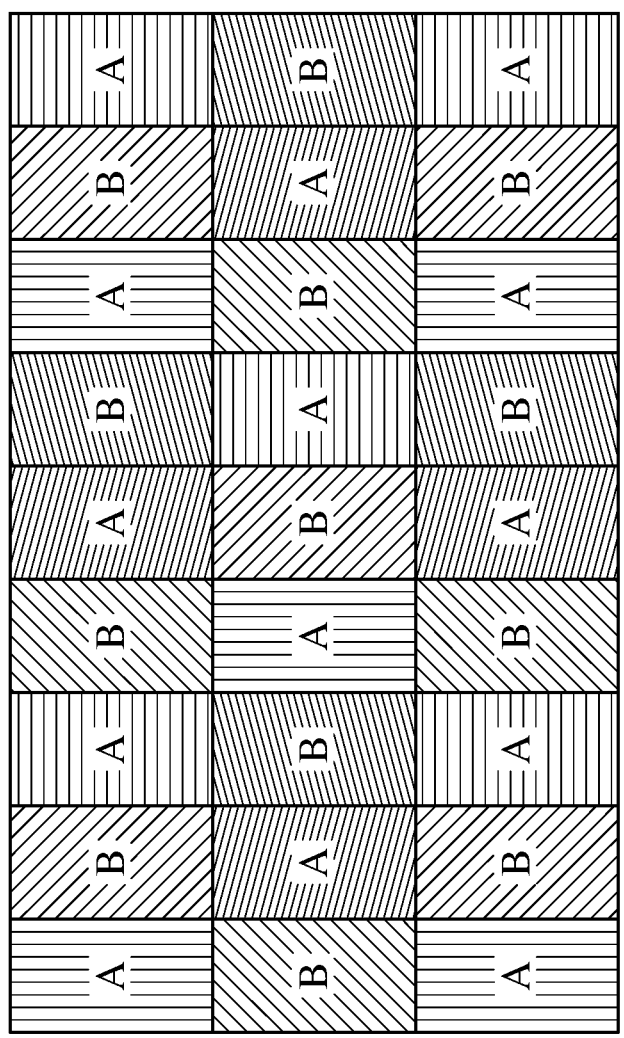
FIG. 5 is a schematic diagram of a space distribution of primary and secondary pixels in an embodiment.

FIG. 5 is a schematic diagram of a space distribution of primary and secondary pixels in an embodiment. During the AB decision, the primary pixel (i.e. A) neighbors with the secondary pixels (i.e. B). For example, the four upper, lower, left and right pixels neighboring with the primary pixel are called secondary pixels. Similarly, the four upper, lower, left and right pixels neighboring with a secondary pixel are called primary pixels.

After the AB decision, the primary pixel and the secondary pixel are applied to their respective adaptive corrections. For example, the variation distribution of the frequency domain value x corresponding to the first proportion R1 of the primary pixel is different from the variation distribution for the secondary pixel. Specifically, during a respective adaptive correction, the adaptive corrector 130 performs the gamma correction procedure on the gray level value to obtain a corrected value and determines the influence of the gamma correction procedure on the correction of the gray level value by the first proportion R1 decided by the frequency-domain analyzer 120. This will be described in detail below.

In an embodiment with respect to FIG. 2, when the first threshold T1 is equal to the second threshold T2, the adaptive corrector 130 can perform different level gamma corrections according to the frequency domain value in the two regions shown in FIG. 2.

For example, when the frequency-domain analyzer 120 determines that the frequency domain value of the pixel p(i,j) is less than the first threshold T1, the first proportion R1 of the pixel p(i,j) is 1 and the second proportion R2 of the pixel p(i,j) is 0. In other words, the adaptive corrector 130 can directly output the corrected value obtained by the gamma correction procedure performed on the gray level value of the pixel p(i,j). When the frequency-domain analyzer 120 determines that the frequency domain value of the pixel p(i,j) is not less than the first threshold T1, the first proportion R1 is 0 and the second proportion R2 is 1. That is, the adaptive corrector 130 directly outputs this gray level value of the pixel p(i,j).

In an embodiment with respect to FIG. 3, when the first threshold T1 is larger than the second threshold T2, the adaptive corrector 130 performs different level gamma corrections according to the frequency domain value in the three regions shown in FIG. 3.

For example, when the frequency-domain analyzer 120 determines that the frequency domain value of the pixel p(i,j) is less than the second threshold T2, the first proportion R1 is 1 and the second proportion R2 is 0. That is, the adaptive corrector 130 outputs the corrected value obtained by the gamma correction procedure performed on the gray level value of the pixel p(i,j). When the frequency-domain analyzer 120 determines that the frequency domain value of the pixel p(i,j) is not less than the first threshold T1, the first proportion R1 is 0 and the second proportion R2 is 1. Herein, the adaptive corrector 130 directly outputs the gray level value of the pixel p(i,j). When the frequency domain value of the pixel p(i,j) is not less than second threshold T2 but is less than the first threshold T1, the first proportion R1 and the second proportion R2 are less than 1 and more than 0.

Figure 6:
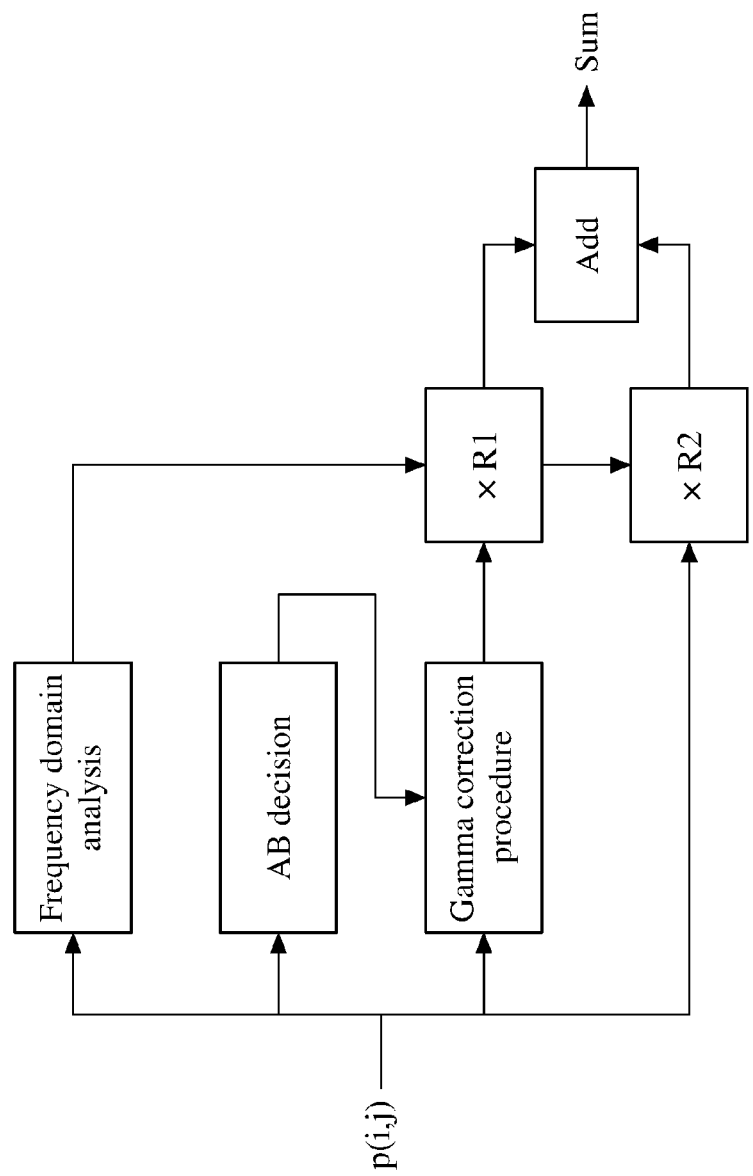
FIG. 6 is a flow chart of an adaptive gamma correction procedure in an embodiment.

Such an adaptive gamma correction will be described in detail by referring to FIG. 3 and FIG. 6, which is a flow chart of an adaptive gamma correction procedure in an embodiment.

When the frequency-domain analyzer 120 determines that the frequency domain value of the pixel p(i,j) is not less than second threshold T2 but is less than the first threshold T1, after the AB decision is performed, the adaptive corrector 130 calculates the product of the corrected value, obtained by the gamma correction procedure performed on the gray level value of the pixel p(i,j), and the first proportion R1 to obtain a first transformed value C1, calculates the product of the gray level value of the pixel p(i,j) and the second proportion R2 to obtain a second transformed value C2, calculates the sum of the first transformed value C1 and the second transformed value C2, and outputs the sum, so as to carry out the adaptive gamma correction procedure.

In this or some embodiments, the variation distribution f2(x) of the first proportion R1 between the first threshold T1 and the second threshold T2 as shown in FIG. 3 is a straight line or other curve.

Moreover, since the frequency domain value with a higher frequency may indicate the detailed image content, a line of a word, or a region edge, the conventional gamma correction may distort it. In the disclosure, in view of FIG. 3, the frequency domain value with a higher frequency has more chances that the gamma correction will not be performed thereon (when the frequency domain value is not less than the first threshold T1), or that the first proportion R1 of the output value occupied by the corrected value is smaller (when the frequency domain value is not less than second threshold T2 but is less than the first threshold T1).

Figure 7:
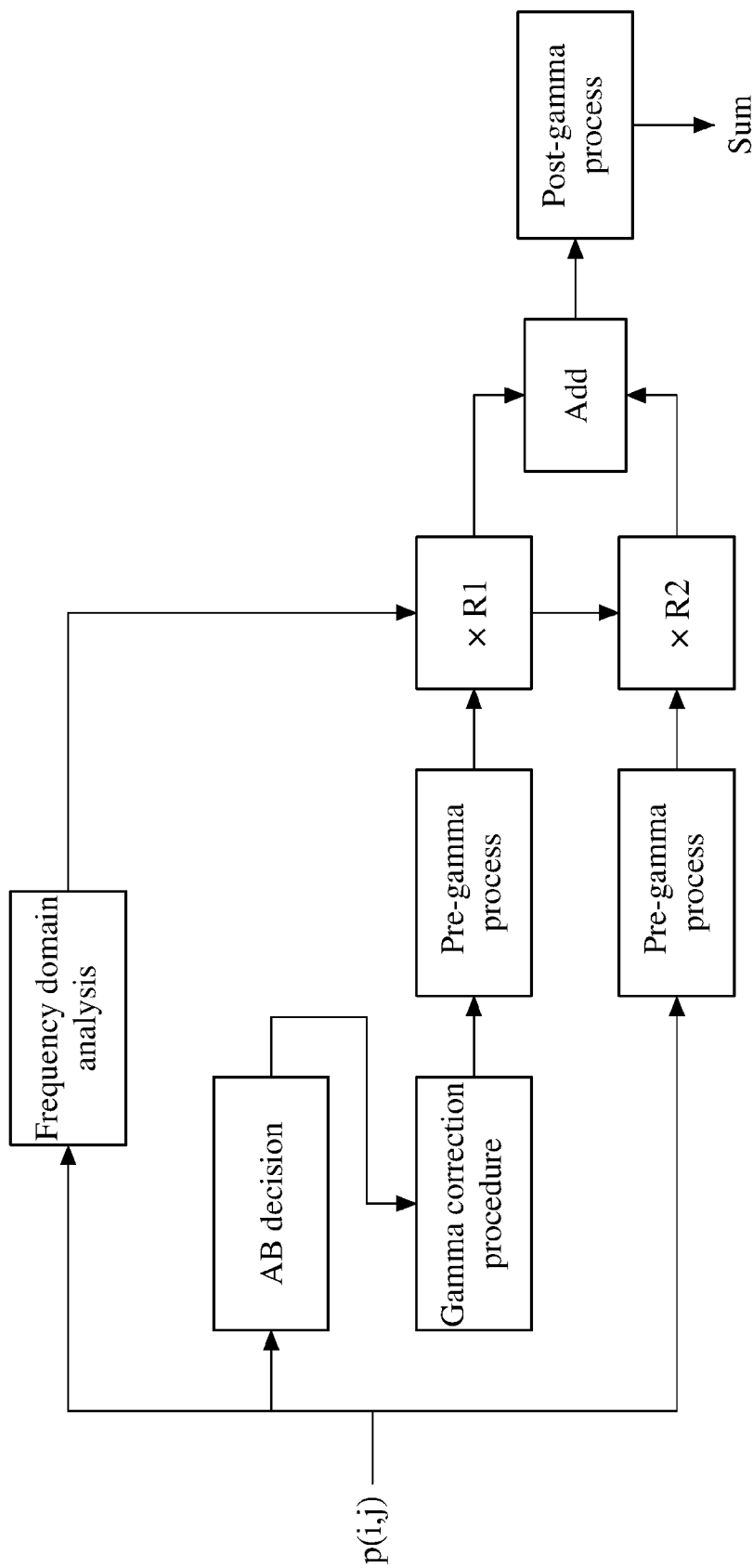
FIG. 7 is a flow chart of an adaptive gamma correction procedure in another embodiment.

FIG. 7 is a flow chart of an adaptive gamma correction procedure in another embodiment. After the AB decision is performed and the gamma correction procedure is performed on the gray level value to obtain the corrected value, the adaptive corrector 130 will perform a pre-gamma process (e.g. converting the gray level value into a brightness signal) on the gray level value and the corrected value to obtain a pre-gamma gray level value and a pre-gamma corrected value, respectively, calculate the product of the pre-gamma corrected value and the first proportion R1 to obtain a first pre-gamma transformed value, calculate the product of the pre-gamma gray level value and the second proportion R2 to obtain a second pre-gamma transformed value, perform a post-gamma process (e.g. converting the brightness signal into a grayscale signal) on the sum of the first pre-gamma transformed value and the second pre-gamma transformed value, and output the result of the post-gamma process, so as to carry out the adaptive gamma correction procedure.

Figure 8:
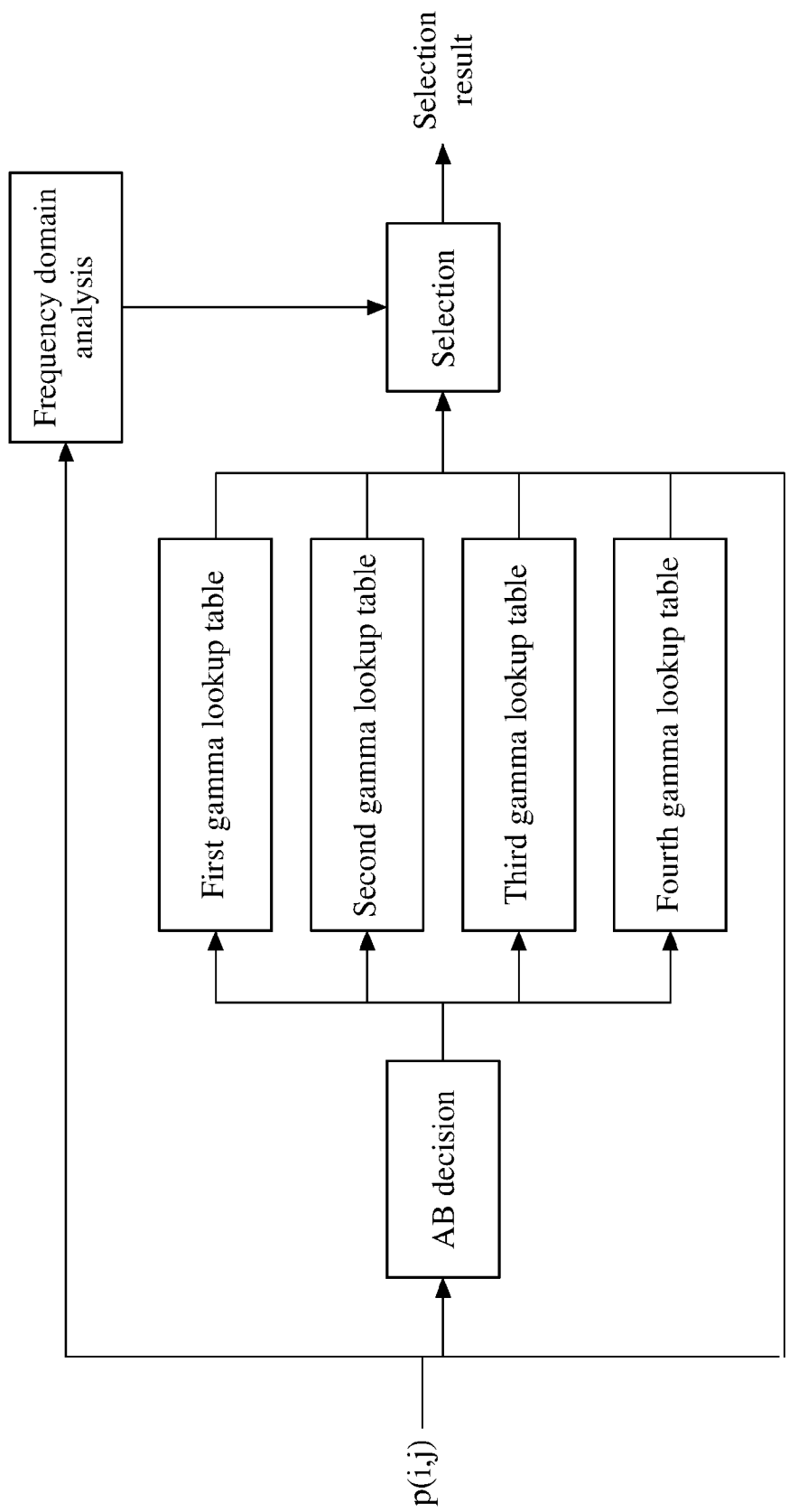
FIG. 8 is a flow chart of an adaptive gamma correction procedure in another embodiment.

FIG. 8 is a flow chart of an adaptive gamma correction procedure in another embodiment. After the AB decision is performed, the adaptive corrector 130 can use multiple built-in gamma lookup tables (e.g. a first gamma lookup table, a second gamma lookup table, a third gamma lookup table and a fourth gamma lookup table) to perform the adaptive gamma correction on the frequency domain value. The frequency-domain analyzer 120 provides a control signal according to a different frequency domain value so that a selector can select the look-up result from one of the gamma lookup tables.

Figure 9:
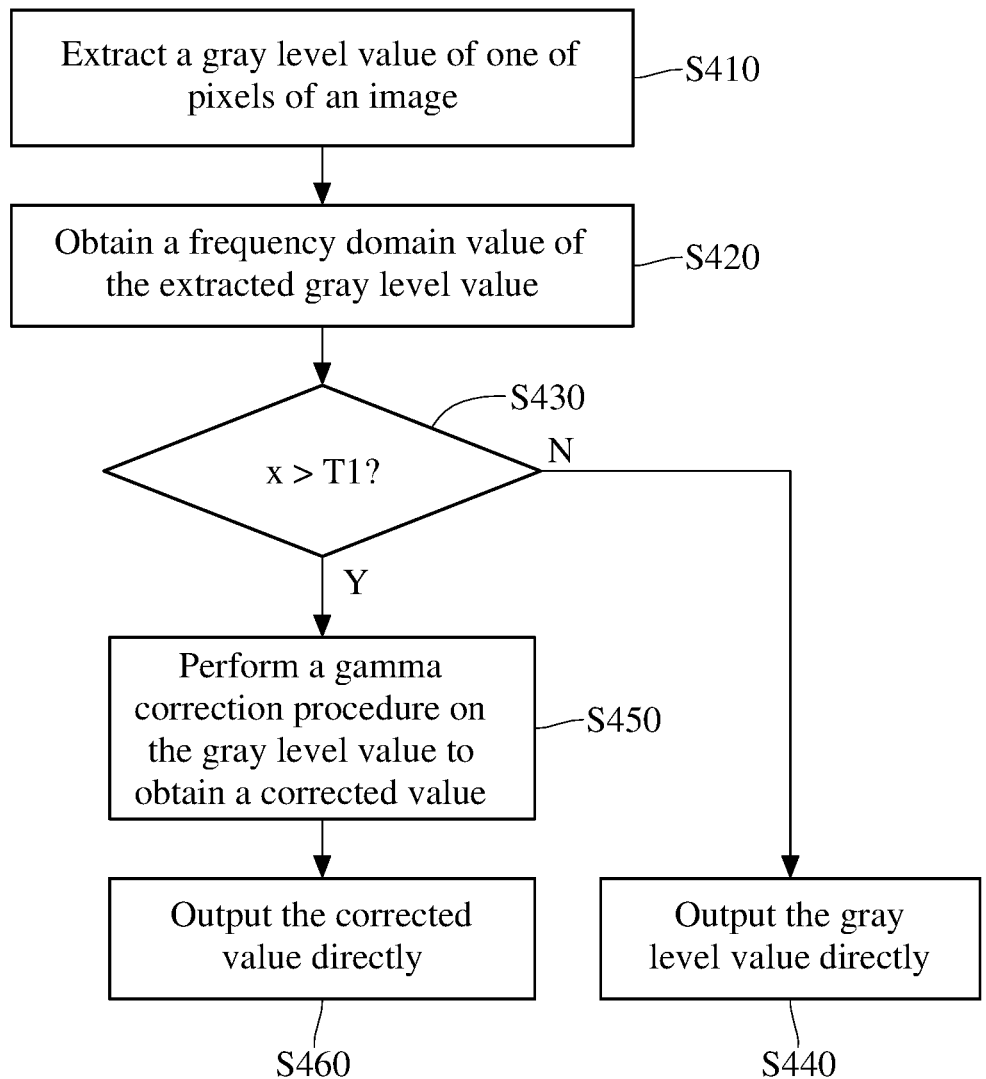
FIG. 9 is a flow chart of an image correction method with respect to FIG. 2 in an embodiment.

FIG. 9 is a flow chart of an image correction method with respect to FIG. 2 in an embodiment. The image correction method includes the following steps S410~S450. Please refer to FIG. 1, FIG. 2 and FIG. 9.

In step S410, the image capturing unit 110 extracts a gray level value of one of pixels of an image. In step S420, the frequency-domain analyzer 120 calculates the frequency domain value of the gray level value. In step S430, the frequency-domain analyzer 120 determines whether the frequency domain value is less than the first threshold T1. In step S440, when the frequency domain value is not less than the first threshold T1, the adaptive corrector 130 directly outputs the gray level value of the pixel. In step S450, when the frequency domain value is less than the first threshold T1, the adaptive corrector 130 performs the gamma correction procedure on the gray level value to obtain a corrected value. In step S460, the adaptive corrector 130 directly outputs the corrected value. The details of these steps have been described above and thus, will not be repeated hereinafter.

Figure 10:
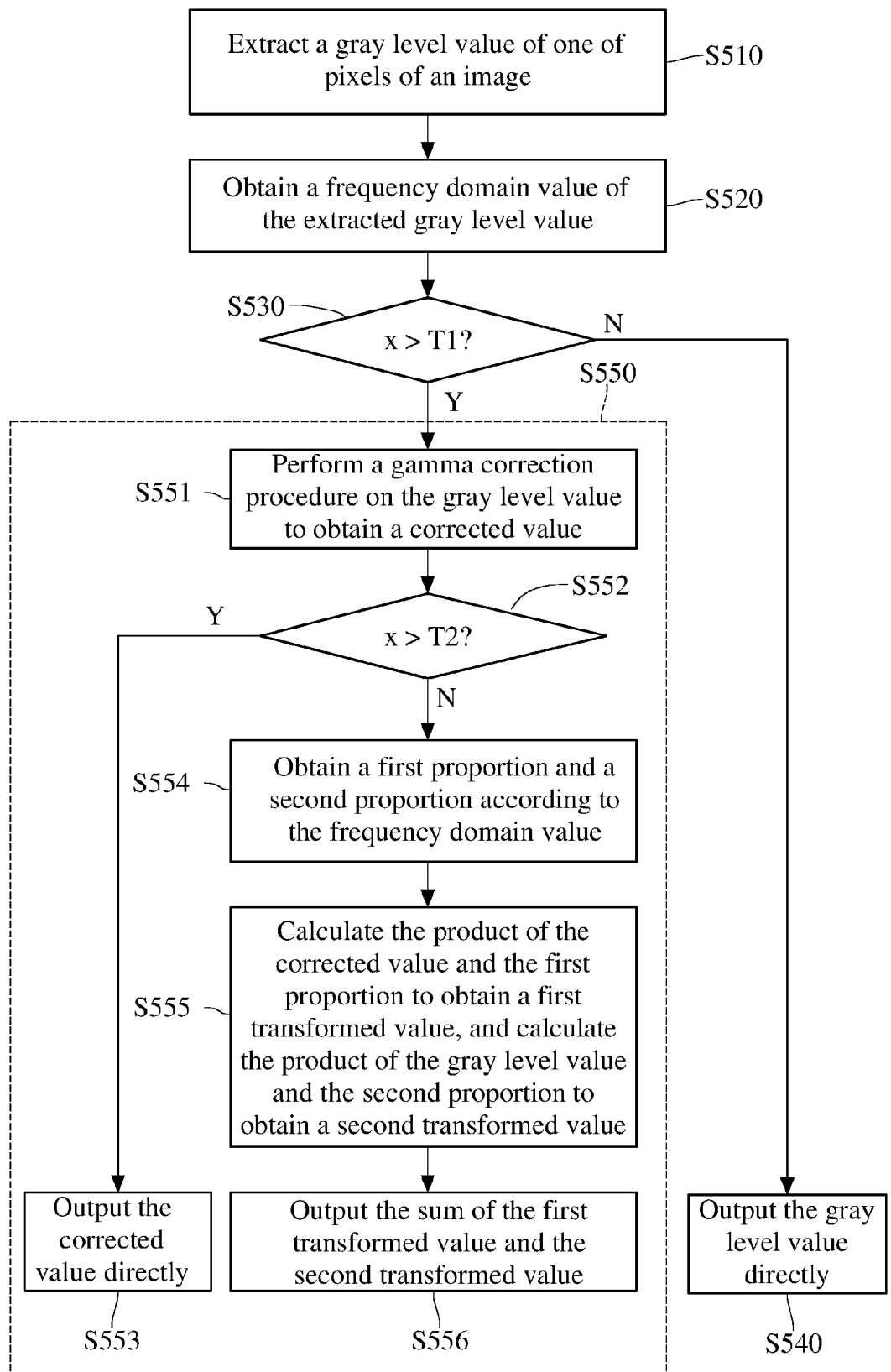
FIG. 10 is a flow chart of an image correction method with respect to FIG. 3 in an embodiment.

FIG. 10 is a flow chart of an image correction method with respect to FIG. 3 in an embodiment. The image correction method includes the steps S510~S550, as shown in FIG. 5, and the step S550 includes steps S551~S556. Please refer to FIGS. 1, 3 and 10.

In step S510, the image capturing unit 110 extracts a gray level value of one of pixels of an image. In step S520, the frequency-domain analyzer 120 calculates the frequency domain value of the gray level value. In step S530, the frequency-domain analyzer 120 determines whether the frequency domain value is less than the first threshold T1. In step S540, when the frequency domain value is not less than the first threshold T1, the adaptive corrector 130 directly outputs the gray level value of the pixel.

In step S550, when the frequency domain value is less than the first threshold T1, the adaptive corrector 130 performs the adaptive gamma correction procedure on the gray level value. In step S551, the adaptive corrector 130 performs the gamma correction procedure on the gray level value to obtain a corrected value. In step S552, the frequency-domain analyzer 120 determines whether the frequency domain value is less than the first threshold T1 and is less than the second threshold T2. In step S553, when the frequency domain value is less than the first threshold T1 but is less than the second threshold T2, the adaptive corrector 130 directly outputs the corrected value. In step S554, when the frequency domain value is less than the first threshold T1 but is not less than the second threshold T2, the adaptive corrector 130 obtains the first proportion R1 and the second proportion R2 according to the frequency domain value. In step S555, the adaptive corrector 130 calculates the product of the corrected value and the first proportion R1 to obtain the first transformed value C1 and calculates the product of the gray level value and the second proportion R2 to obtain the second transformed value C2. In step S556, the adaptive corrector 130 sums up the first transformed value C1 and the second transformed value C2 and outputs the sum. The details of these steps have been described above and thus, will not be repeated hereinafter.

As set forth above, the disclosure employs the frequency-domain analyzer 120 to calculate gray differences between one of the pixels and its neighboring pixels, calculate an average of the gray differences, and set the average as a frequency domain value of the gray level value after employing the image capturing unit 110 to extract a gray level value of any one of an image. According to the analysis result, the frequency-domain analyzer 120 analyzes the frequency domain value, and the adaptive corrector 130 determines to directly output the gray level value or further perform an adaptive gamma correction procedure.

In one accept, the frequency-domain analyzer 120 may set the first proportion R1, which the corrected value obtained by the gamma correction procedure occupies an output value, and the second proportion R2, which the original gray level value occupies the output value, and the adaptive corrector 130 may further perform the gamma correction procedure, calculate the first transformed value C1 corresponding to the first proportion R1 and the second transformed value C2 corresponding to the second proportion R2, and output the sum of the first transformed value C1 and the second transformed value C2. In another aspect, the adaptive corrector 130 may further perform the pre-gamma process and the post-gamma process. In yet another aspect, the adaptive corrector 130 may use multiple built-in gamma lookup tables to perform the adaptive gamma correction on the frequency domain value.

Therefore, the disclosure may avoid the distortion of high-frequency signals in an image document or the color washout or broken edges in the detailed image content occurring in the conventional gamma correction.

What is claimed is:
1. An image correction method, comprising:
   extracting a gray level value of one of pixels of an image and a frequency domain value of the extracted gray level value;
   determining whether the frequency domain value is less than a first threshold;

performing an adaptive gamma correction procedure on the gray level value according to the frequency domain value and then outputting a corrected gray level value when the frequency domain value is less than the first threshold; and directly outputting the gray level value when the frequency domain value is not less than the first threshold.

2. The image correction method according to claim 1, wherein performing the adaptive gamma correction procedure on the gray level value according to the frequency domain value and then outputting the corrected gray level value comprises:

performing a gamma correction procedure on the gray level value to obtain a corrected value;

determining whether the frequency domain value is less than a second threshold; and directly outputting the corrected value as the corrected gray level when the frequency domain value is less than the second threshold.

3. The image correction method according to claim 2, wherein performing the adaptive gamma correction procedure on the gray level value according to the frequency domain value and then outputting the corrected gray level value further comprises:

obtaining a first proportion according to the frequency domain value and calculating a product of the corrected value and the first proportion to obtain a first transformed value when the frequency domain value is not less than the second threshold;

calculating a product of the gray level value and a second proportion to obtain a second transformed value; and outputting a sum of the first transformed value and the second transformed value, wherein a sum of the first proportion and the second proportion is 1.

4. The image correction method according to claim 3, wherein when the frequency domain value is equal to the first threshold, the first proportion is 0; and when the frequency domain value is equal to the second threshold, the first proportion is 1.

5. The image correction method according to claim 2, wherein extracting the gray level value of each of the pixels of the image and the frequency domain value of the extracted gray level value comprises:

calculating a gray difference between one of the pixels and each of neighboring pixels of the pixels; and calculating an average of the gray differences and setting the average of the gray differences to be the frequency domain value of the gray level value.

6. The image correction method according to claim 5, wherein extracting the gray level value of each of the pixels of the image and the frequency domain value of the extracted gray level value further comprises:

calculating absolute row gray differences between one of the pixels and its neighboring row pixels and calculating an average of the absolute row gray differences; and calculating absolute column gray differences between one of the pixels and its neighboring column pixels and calculating an average of the absolute column gray differences.

7. The image correction method according to claim 6, wherein extracting the gray level value of each of the pixels of the image and the frequency domain value of the extracted gray level value further comprises:

selecting larger one of the average of the absolute row gray differences and the average of the absolute column gray differences to be the frequency domain value of the pixel.

8. An image correction device, comprising:

an image capturing unit configured to extracting a gray level value of one of pixels of an image;

a frequency-domain analyzer coupled to the image capturing unit and configured to calculating a frequency domain value of the gray level value and determine whether the frequency domain value is less than a first threshold; and an adaptive corrector coupled to the image capturing unit and the frequency-domain analyzer, configured to perform an adaptive gamma correction procedure on the gray level value according to the frequency domain value and then output a corrected gray level value when the frequency domain value is less than the first threshold, and configured to directly output the gray level value when the frequency domain value is not less than the first threshold.

9. The image correction device according to claim 8, wherein the adaptive corrector further performs a gamma correction procedure on the gray level value to obtain a corrected value, and the frequency-domain analyzer further determines whether the frequency domain value is less than a second threshold; and when the frequency domain value is less than the second threshold, the adaptive corrector directly outputs the corrected value as the corrected gray level value.

10. The image correction device according to claim 9, wherein when the frequency domain value is not less than the second threshold, the frequency-domain analyzer obtains a first proportion and a second proportion according to the frequency domain value, a sum of the first proportion and the second proportion is 1, and the adaptive corrector calculates a product of the corrected value and the first proportion to obtain a first transformed value, calculates a product of the gray level value and the second proportion to obtain a second transformed value, and outputs a sum of the first transformed value and the second transformed value.

11. The image correction device according to claim 10, wherein when the frequency domain value is equal to the first threshold, the frequency-domain analyzer sets the first proportion to be 0; and when the frequency domain value is equal to the second threshold, the frequency-domain analyzer sets the first proportion to be 1.

12. The image correction device according to claim 9, wherein the frequency-domain analyzer further calculates a gray difference between one of the pixels and each of neighboring pixels of the pixels, calculates an average of the gray differences, and sets the average of the gray differences to be the frequency domain value of the gray level value.

13. The image correction device according to claim 12, wherein the frequency-domain analyzer further calculates absolute row gray differences between one of the pixels and its neighboring row pixels, calculates an average of the absolute row gray differences, calculates absolute column gray differences between one of the pixels and its neighboring column pixels, and calculates an average of the absolute column gray differences.

14. The image correction device according to claim 13, wherein the frequency-domain analyzer further selects larger one between the average of the absolute row gray differences and the average of the absolute column gray differences to be the frequency domain value of the pixel.

* * * * *